US007457772B2

(12) United States Patent
Tabin (10) Patent No.: US 7,457,772 B2
(45) Date of Patent: Nov. 25, 2008

(54) METHOD AND APPARATUS FOR INTERACTIVE CRITERIA-BASED COMMODITY COMPARISONS

(76) Inventor: Joshua Z. Tabin, 353/71 Dr. Horakove, Podebrady (CZ) 29001

( * ) Notice: Subject to any disclaimer, the term of this patent is extended or adjusted under 35 U.S.C. 154(b) by 317 days.

(21) Appl. No.: 11/327,277

(22) Filed: Jan. 6, 2006

(65) Prior Publication Data

US 2007/0162355 A1    Jul. 12, 2007

(51) Int. Cl.
*G06Q 30/00* (2006.01)

(52) U.S. Cl. ................ 705/27; 715/810; 715/833; 715/834; 715/863; 715/974; 715/771; 715/772; 715/773

(58) Field of Classification Search ............... 715/771, 715/772, 773, 833, 834, 974, 810; 705/27
See application file for complete search history.

(56) References Cited

U.S. PATENT DOCUMENTS

| | | | |
|---|---|---|---|
| 4,992,940 A | 2/1991 | Dworkin | |
| 5,583,763 A | 12/1996 | Atcheson et al. | |
| 5,749,081 A | 5/1998 | Whiteis | |
| 5,774,868 A | 6/1998 | Cragun et al. | |
| 6,070,149 A | 5/2000 | Travor et al. | |
| 6,326,962 B1 * | 12/2001 | Szabo | 715/762 |
| 6,658,424 B1 | 12/2003 | Boehm et al. | |
| 6,785,671 B1 | 8/2004 | Bailey et al. | |
| 6,795,810 B2 | 9/2004 | Ruppeit et al. | |
| 6,867,785 B2 * | 3/2005 | Smith | 345/582 |
| 7,007,245 B2 * | 2/2006 | D'Souza et al. | 715/853 |
| 2002/0077927 A1 | 6/2002 | Lasnier et al. | |
| 2002/0161664 A1 | 10/2002 | Shayna et al. | |
| 2003/0061212 A1 | 3/2003 | Smith et al. | |
| 2003/0105682 A1 | 6/2003 | Dicker et al. | |
| 2003/0174157 A1 * | 9/2003 | Hellman | 345/700 |
| 2003/0195877 A1 | 10/2003 | Ford et al. | |
| 2004/0024656 A1 | 2/2004 | Coleman | |

OTHER PUBLICATIONS

Javascript Slider Weight Control by Robbe D. Morris, publicly available prior to Jan. 6, 2005, 16 pages. Retrieved from the Internet: <URL: http://www.eggheadcafe.com/articles/20020922.asp.
Yahoo! Shopping Digital Camera SmartSort, publicly available prior to Jan. 6, 2005, 1 page. Retrieved from the Internet: <URL: http://shopping.yahoo.com/sort_tool_digicamera.
DHTML Sliders, publicly available prior to Jan. 6, 2005, 1 page. Retrieved from the Internet: <URL: http://www.littlenerd.com/JSSliders/Index.html.
My Product Advisor, publicly available prior to Jan. 6, 2005, 4 pages. Retrieved from the Internet: <URL: http://www.myproductadvisor.com/mpa/home.do.

* cited by examiner

*Primary Examiner*—Dennis-Doon Chow
*Assistant Examiner*—Patrick F Riegler
(74) *Attorney, Agent, or Firm*—Fitch, Even, Tabin & Flannery (57) ABSTRACT

A method and apparatus to remember and attempt to persist relative differences between automatically adjusted current weight values for non-directly adjusted graphic user interface elements, notwithstanding previous automatic adjustment of these current weighting values to a point of equality. A plurality of user-alterable graphic user interface elements are provided (101), with each element corresponding to at least one alterable selection criteria. The plurality of user-alterable graphic user interface elements illustrate current weighting values, wherein the aggregate sum of the current weighting values comprises a particular value. A user then alters (102) a graphic user interface element, causing a change in the corresponding weighting value. The relative weighting values of the non-adjusted graphic user interface elements are stored (103) and then current weighting values for the non-adjusted elements are automatically adjusted (104) as a function of the user alteration and the stored relative value information.

23 Claims, 9 Drawing Sheets

FIG. 13

METHOD AND APPARATUS FOR INTERACTIVE CRITERIA-BASED COMMODITY COMPARISONS

TECHNICAL FIELD

This invention relates generally to interactive commodity comparisons.

BACKGROUND

When a consumer considers purchasing a product or service, the consumer will frequently be interested in acquiring more information about that product or service. Further, the consumer may wish to make a comparison of the products or services that are currently available in the market in order to determine what product might be suitable for the consumer's needs and/or desires. Individually researching each product or service can be time-consuming and burdensome. In addition, the research may require the consumer to have some prior knowledge or familiarity with the features and/or options for the product or service in order to determine relevant points of comparison.

Those skilled in the art are familiar with the existence of various types of information-filtering and product comparison tools. These tools are often web-based and typically allow a consumer to obtain information regarding a product or service and make comparisons of various makes, models and/or types of products and services. This comparison may, for example, be based on specific selection criteria related to that product or service. The selection criteria may be provided by the consumer or may be pre-defined by the website administrator. The websites may also provide additional information regarding the produce or service, such as pricing, reviews, or ratings.

Notwithstanding the existence of these web-based product comparison tools, numerous issues exist with respect to their configuration and application. Some product comparison tools allow a consumer to rate the relative importance of the selection criteria based on the preferences of the consumer. In rating the relative importance of the selection criteria, the consumer may be allowed to assign a weighting value to each selection criterion which corresponds to the level of priority a consumer gives to that criterion. However, it is likely that a consumer may decide that many or all of the criteria should be given high priority and will therefore "max out" the weighting value for each. Maximizing many or all of the criteria will generally produce a result similar to that which would be produced if no priority or importance was assigned, thereby decreasing the effectiveness of the weighting values. Therefore, it may be helpful to have the total weighting values for all criteria equal a particular value, thereby creating a tensile effect such that when one setting is increased, all the other settings will shift correspondingly to maintain the total value. This option compels the consumer to consider and prioritize the criteria when comparing and selecting products.

Despite present attempts to provide weighted sliders having relative movement, problems still remain. In present comparison tools, relative weighting values will not persist once weighted sliders are adjusted to a point of equality. To elaborate, if one criterion is "maxed out" in the relative weighting system, then every other criterion must be set at zero to maintain the aggregate value. In some present comparison tools, when this point of equality occurs, the relative values of the settings are lost. Therefore, when the consumer subsequently moves the maxed out criterion away from the maxed out position, all the remaining sliders will move in common with one another as the previously set relative positions are no longer maintained.

There are other problems with prior art approaches as well. For example, when looking at a ranked list of products following a search, the consumer may wish to see the corresponding weighting values for a product that was ranked lower on the list. A typical existing offering makes no accommodation for such a capability. As another example, a consumer may be familiar with a particular product that is no longer in production. The consumer may prefer the features of that particular product, but is not sure how those features would translate or factor into weighted selection criteria. Again, present product comparison tools do not provide for these features.

Simply put, present product comparison tools do not provide for a suitably user-friendly and effective product comparison tool that will allow a consumer to make an informed buying decision.

BRIEF DESCRIPTION OF THE DRAWINGS

The above needs are at least partially met through provision of the Method and Apparatus for Interactive Criteria-Based Commodity Comparisons described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Pursuant to a general approach in accordance with these teachings, a plurality of user-alterable graphic user interface elements are provided, via a display, with each element corresponding to at least one alterable selection criteria. The plurality of user-alterable graphic user interface elements illustrate current weighting values as correspond to the alterable selection criteria, wherein the aggregate sum of the current weighting values comprises a particular value. A user then alters one of the user-alterable graphic user interface elements, causing a change in the weighting value that corresponds to that element. The relative weighting values of the non-directly-adjusted graphic user interface elements are stored and then current weighting values for the non-directly-adjusted graphic user interface elements are automatically adjusted as a function of the user alteration and the stored relative value information. This ensures that the aggregate sum of the current weighting values continues to comprise the particular value and also ensures that the non-directly-adjusted user-alterable graphic user interface elements continue to maintain their relative values. In accordance with the above-stated approach, this method will remember and attempt to persist relative differences between automatically adjusted current weight values for non-directly adjusted graphic user interface elements, notwithstanding previous automatic adjustment of these current weighting values to a point of equality.

The user may also be provided, via the display, a concurrent presentation of at least one commodity that best matches the current weighting values for the selection criteria. Further, upon user alteration of a user-alterable graphic user interface element, a best match based on the adjusted current weighting values may then be displayed. The current weighting values for the user-alterable graphic user interface elements may also be provided to the user.

By one optional approach, a user is provided with at least one user-selectable commodity via the display. Upon selection of that user-selectable commodity, the weighting values for the selection criteria are automatically determined for that user-selectable commodity. The user-alterable graphic user interface elements are then used to illustrate the weighting values for the commodity. This method may further optionally apply even when the commodity is no longer in production. In that case, historical information regarding the user-selectable commodity is accessed and used to automatically determine the weighting values for the selection criteria as correspond to the commodity.

So configured, a user may readily compare products in order to select a product that is suitable for the needs and desires of the user. The user is able to interactively adjust the weighting values of the selection criteria based on the factors that the user deems important and relevant. Relative weighting values are maintained, however, such that the total weight for all selection criteria may not exceed a preset particular value. These relative values are maintained even when weighting values reach a point of equality. This, in turn, provides for a more effective and efficient method of product comparison so that a consumer may make an informed buying decision.

Figure 1:
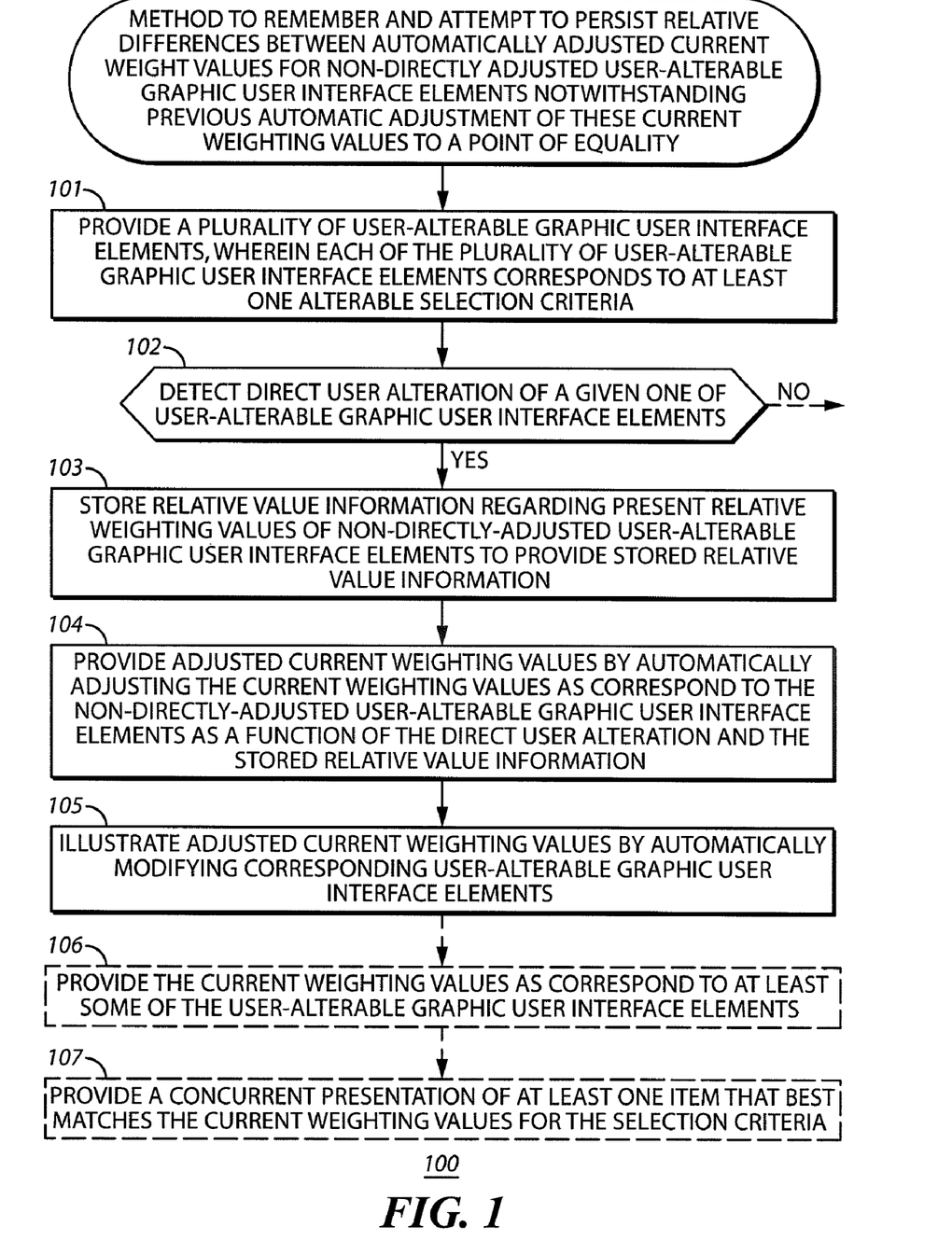
FIG. 1 comprises a flow diagram as configured in accordance with various embodiments of the invention.

These and other benefits may become clearer upon making a thorough review and study of the following detailed description. Referring now to the drawings, and in particular to FIG. 1, a given enabling method 100 will provide 101, via a display, a plurality of user-alterable graphic user interface elements. In one approach, the display may comprise, for example, a browser-based display. The plurality of user-alterable graphic user interface elements may comprise, for example, at least one of:

a slider tool;
a rotating knob;
a push, hold, and drag button;
a touch screen element; and/or
a select, drag and drop value.

Each of the plurality of user-alterable graphic user interface elements corresponds to at least one alterable selection criteria, such that the plurality of user-alterable graphic user interface elements serve to illustrate current weighting values as correspond to such alterable selection criteria. The alterable selection criteria may comprise, for example, criteria as pertain to points of differentiation between commodities (where a commodity may include, for example, a product or a service). Such points of differentiation may relate, for example, to any of a variety of features and options for that particular commodity. Further, the alterable selection criteria may also comprise criteria as pertain to points of user preference. The points of user preference may relate to features and options, but may also relate to other categories of criteria, such as, for example, price or availability. The display may optionally provide for an explanation or a link to an explanation that may define, describe, or otherwise clarify for the user the selection criteria that is provided.

By one approach the aggregate sum of the current weighting values as correspond to all of the plurality of user-alterable graphic user interface elements will comprise a particular value. The particular value may be any value as set and determined by the system administrator. The total value of the user-alterable graphic user interface elements will remain constant, such that increasing one element will automatically create a corresponding decrease in movement of the other user-alterable graphic user interface elements to maintain the particular value. As an illustrative example, the weighting values could be based on a 100 point scale, which could alternately be considered in terms of percentage. If there were five user-alterable graphic user interface elements, for example, then the combined total of the weighting values for the user-alterable graphic user interface elements would always have to total 100 points. Therefore, if one user-alterable graphic user interface element is adjusted up or down, the other four user-alterable graphic user interface elements would be adjusted accordingly so as to maintain the 100 point total.

By one optional approach, at least one of the user-alterable graphic user interface elements may also comprise a multi-criteria user-alterable graphic user interface element that corresponds to at least two alterable selection criteria. As an illustrative example, where the commodity at issue is a digital camera, one of the graphic user interface elements may be labeled "picture quality." However, this element may actually correspond to two selection criteria, such as the resolution and dynamic range for the camera. Further, the at least two alterable selection criteria that form the multi-criteria user-alterable graphic user interface element may each have a corresponding weighting value, wherein the weighting value for the multi-criteria user-alterable graphic user interface element comprises a sum of the weighting values as correspond to each of the at least two alterable selection criteria. Referring to the previous illustrative example, in which the multi-criteria element was "picture quality," the resolution may account for 75% of the "picture quality" element and the dynamic range may account for 25% of the "picture quality" element. Therefore, if the "picture quality" element has a current weighting value, for example, of 48 points, then the resolution will account for 75%, or 36 points, of the total and the dynamic range will account for 25%, or 12 points, of the total.

In addition, a user-assertable selector may optionally be provided, via the display, in conjunction with the at least one multi-criteria user-alterable graphic user interface element. Upon detecting user assertion of the user-assertable selector, the user-alterable graphic user interface elements which correspond to the at least two alterable selection criteria will then be displayed. The user may assert the selector using any known computer input device. To further elaborate on the details of the previous illustrative example, a selector would be provided in conjunction with the "picture quality" multi-criteria element. Upon assertion of that selector, user-alterable graphic user interface elements for resolution and dynamic range would then be displayed. Therefore, the user is able to determine what alterable selection criteria correspond to the multi-criteria element. Information relating to each element's weighting values may also be displayed.

Upon being provided 101 with the plurality of user-alterable graphic user interface elements, a direct user alteration of a given one of the user-selectable graphic user interface elements is detected 102. This alteration causes a change in the weighting value that corresponds to the given one of the user-alterable graphic user interface elements. The user-alterable graphic user interface elements may be altered according to the particular features of the user-alterable graphic user interface element that is used. For example, a slider tool may be altered by sliding it in one direction or another, with the weighting values being adjusted according to the direction and extent of the movement. If direct user alteration is not detected, then the user-alterable graphic user interface elements remain unchanged and the flow of this process 100 terminates.

The relative value information regarding the present relative weighting values of non-directly-adjusted user-alterable graphic user interface elements is then stored 103 to provide stored relative value information. In this way, each element "remembers" its position. Adjusted current weighting values are then provided 104 by automatically adjusting the current weighting values as correspond to the non-directly-adjusted user-alterable graphic user interface elements. These weighting values are adjusted as a function, at least in part, of the direct user alteration and the stored relative value information to ensure that the aggregate sum of the current weighting values as correspond to all of the user-alterable graphic user interface elements continues to comprise the particular value. The adjusted weighting values also ensure, to an extent reasonably possible, that the current weighting values of each of the non-directly-adjusted user-alterable graphic user interface elements continue to maintain their relative values vis-à-vis one another. Therefore, the non-directly-adjusted user-alterable graphic user interface elements will not only adjust to reflect movement of another element, but will adjust in a manner that maintains the non-directly-adjusted user-alterable graphic user interface elements initial relative positions. The adjusted current weighting values are then illustrated 105 by automatically modifying corresponding user-alterable graphic user interface elements. In addition, the current weighting values as correspond to at least some of the user-alterable graphic user interface elements may be optionally provided 106 via the display.

Further, a concurrent presentation may be provided 107, via the display, to show at least one item that best matches the current weighting values for the selection criteria. In addition, the concurrent presentation may also automatically display at least one item that then best matches the current weighting values subsequent to detecting direct user alteration of the given one of the user-alterable graphic user interface elements. Therefore, a user may be shown the commodity or commodities that most closely meet the weighting values specified by the user both before and after the alteration of the user-alterable graphic user interface elements. As the user adjusts the user-alterable graphic user interface element settings, the most closely matching commodity will be displayed. It should be noted that the commodity or commodities that are displayed as a "best match" might not exactly match the user-defined settings. Rather, the at least one commodity being displayed may be the most closely-matching commodity to the user-alterable graphic user interface element settings.

Figure 2:
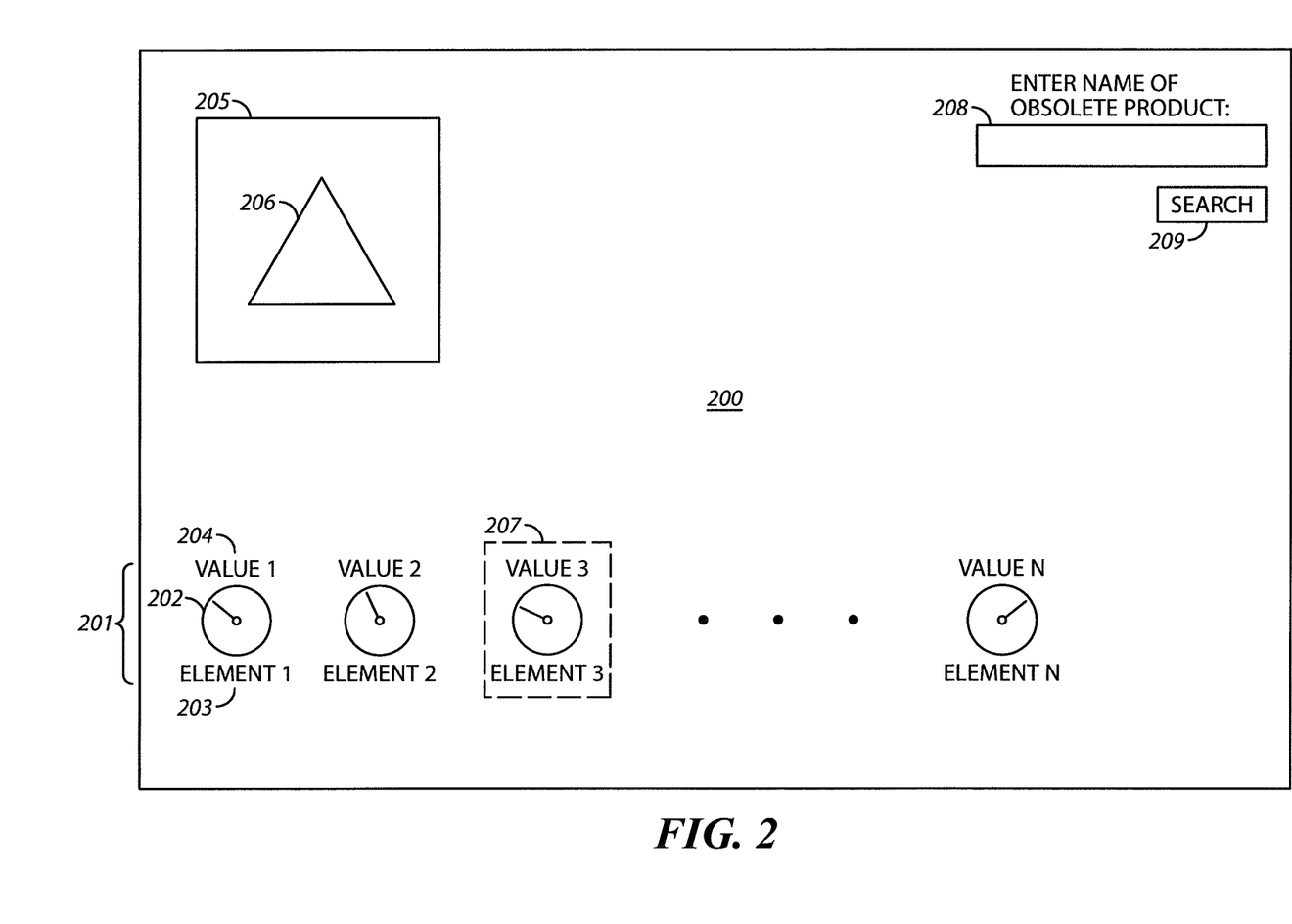
FIG. 2 comprises a schematic example of a display as configured in accordance with various embodiments of the invention.

To illustrate the above teachings, and referring now to FIG. 2, a schematic example of a display 200 is shown. It should be noted and understood at the outset that these display schematics are illustrative embodiments of the methods used for comparing commodities. As such, it will be clearly understood that the options, functions, arrangements, and displays of these teachings are not limited to those specifically shown in these embodiments. In this example, a row of user-alterable graphic user interface elements 201 are provided which, in this embodiment, are represented by rotating knobs 202 that can be rotated clockwise or counter clockwise to adjust the weighting values. The display may contain as many user-alterable graphic user interface elements as are necessary and/or appropriate for the particular commodity being searched. Each user-alterable graphic user interface element has a label 203 and represents a particular criterion for the type of product being searched. In addition, the corresponding current weighting value 204 for each user-alterable graphic user interface element is also displayed. According to the initial settings of the user-alterable graphic user interface elements, a commodity display area 205 displays the best matched commodity 206 (schematically represented here by a triangle).

Figure 3:
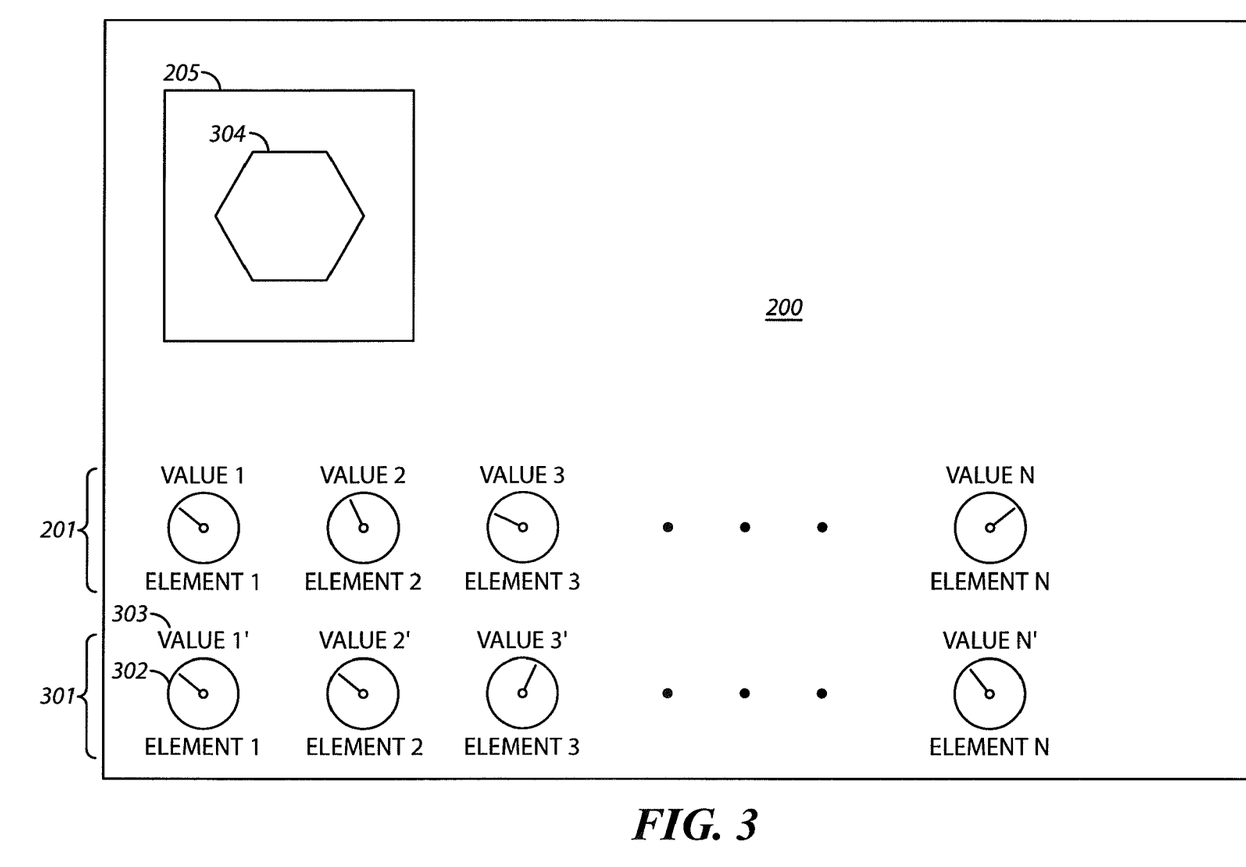
FIG. 3 comprises a schematic example of a display as configured in accordance with various embodiments of the invention.

The user may then decide to adjust one of the user-alterable graphic user interface elements. In this example the third element 207 is increased by the user by turning the knob counter clockwise. At this point, the relative values of the non-directly adjusted user-alterable graphic user interface elements are stored. Referring now to FIG. 3, in this illustrative example the adjusted current weighting values are now shown in a second row of user-alterable graphic user interface elements 301, with the initial settings being shown in the first row 201. The third element value increased, and therefore the remaining elements were decreased so that the aggregate sum of the weighting values would not exceed the specified value. However, the relative positions of the remaining elements vis-à-vis one another were maintained. The positions of the rotating knobs 302 reflect the adjustment and the corresponding adjusted weighting values 303 are displayed. In addition the commodity display area 205 now displays a new "best match" commodity 304 based on the newly adjusted element settings.

As set forth in the above teachings, the given enabling method 100, as shown in FIG. 1, will remember and attempt to persist relative differences between automatically adjusted current weight values for non-directly adjusted user-alterable graphic user interface elements, notwithstanding previous automatic adjustment of these current weighting values to a point of equality.

Figure 4:
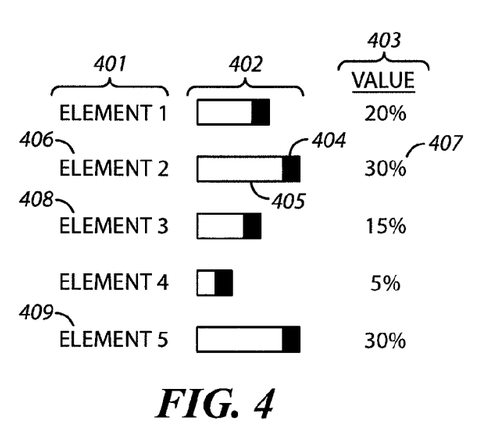
FIG. 4 comprises a schematic example of a display as configured in accordance with various embodiments of the invention.

To illustrate, and referring now to FIG. 4, a schematic example of a plurality of user-alterable graphic user interface elements are shown. In this example, a column 401 of five user-alterable graphic user interface elements is provided, with each element relating to an alterable selection criterion. The elements are each graphically depicted by slider tools 402, with each slider tool having an associated weighting value as displayed in the value column 403. The slider tool for each element may be adjusted by selecting the end portion of the tool 404 (using any known computer input device) and sliding the end portion 404 to the right or the left, thereby increasing or decreasing the length portion 405 and the corresponding weighting value 407. It should be noted that in this illustration, the aggregate sum of the weighting value totals 100%.

In this illustration, the elements are initially set as shown in FIG. 2. Specifically, Element 2 406 is currently assigned a value of 30%, as shown in the value column 403. However, a user may decide that Element 2 406 should be assigned a higher value because the feature associated with that element's criterion is of more importance to the user. Therefore, the user would move the end portion 404 of the slider tool, thereby increasing the length portion 405 and the weighting value 407. The relative weighting values of the remaining four non-adjusted elements are then stored. When Element 2 406 is adjusted upward, the remaining elements are adjusted downward, so that the aggregate sum of the weighting values will not exceed 100%. The weighting values of the remaining four elements, however, will be adjusted such that the elements continue to maintain their relative values vis-à-vis one another.

Figure 5:
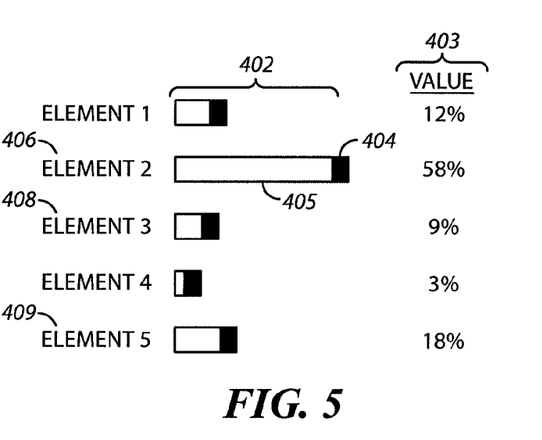
FIG. 5 comprises a schematic example of a display as configured in accordance with various embodiments of the invention.

This relative movement can be seen in FIG. 5. In this illustration, Element 2 406 has been increased to a value of 58%. For the remaining four user-alterable graphic user interface elements, the weighting values listed in the value column 403 of FIG. 5 have gone down from the values that were displayed for those elements in the value column 403 of FIG. 4, so that the total remains at 100%. The slider tools 402 have adjusted in length to reflect the new weighting values. In addition, the weighting values and slider tools have maintained relative positions vis-à-vis one another. For example, and referring to FIG. 4, the value for Element 3 408 was initially set at 15% and the value for Element 5 409 was set at 30%, or twice the amount of the value for Element 3 408. Referring now to FIG. 5, the value for Element 3 408 has been reduced to 9% and the value for Element 5 409 has been reduced to 18% to account for the increase in Element 2 406, however the relative values have been maintained such that Element 5 409 is still twice the amount of Element 3 408.

Figure 6:
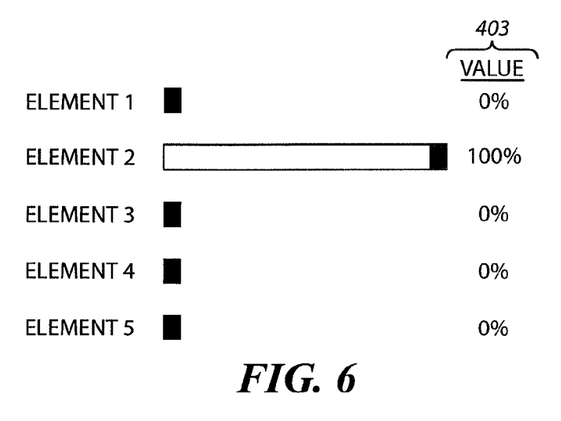
FIG. 6 comprises a schematic example of a display as configured in accordance with various embodiments of the invention.

Referring now to FIG. 6, Element 2 406 has been further increased to reach the maximum value of 100%. Therefore, the remaining four elements must be decreased down to 0% so the aggregate sum of all weighting values remains at 100%, as shown by the value column 403. Although the remaining four elements all have a 0% weighting value, the relative values of the elements prior to the adjustment has been stored.

As a result, if Element 2 406 is moved back down to a value of 58%, as shown in FIG. 5, the four remaining elements would adjust themselves to the relative positions shown in FIG. 5.

Figure 7:
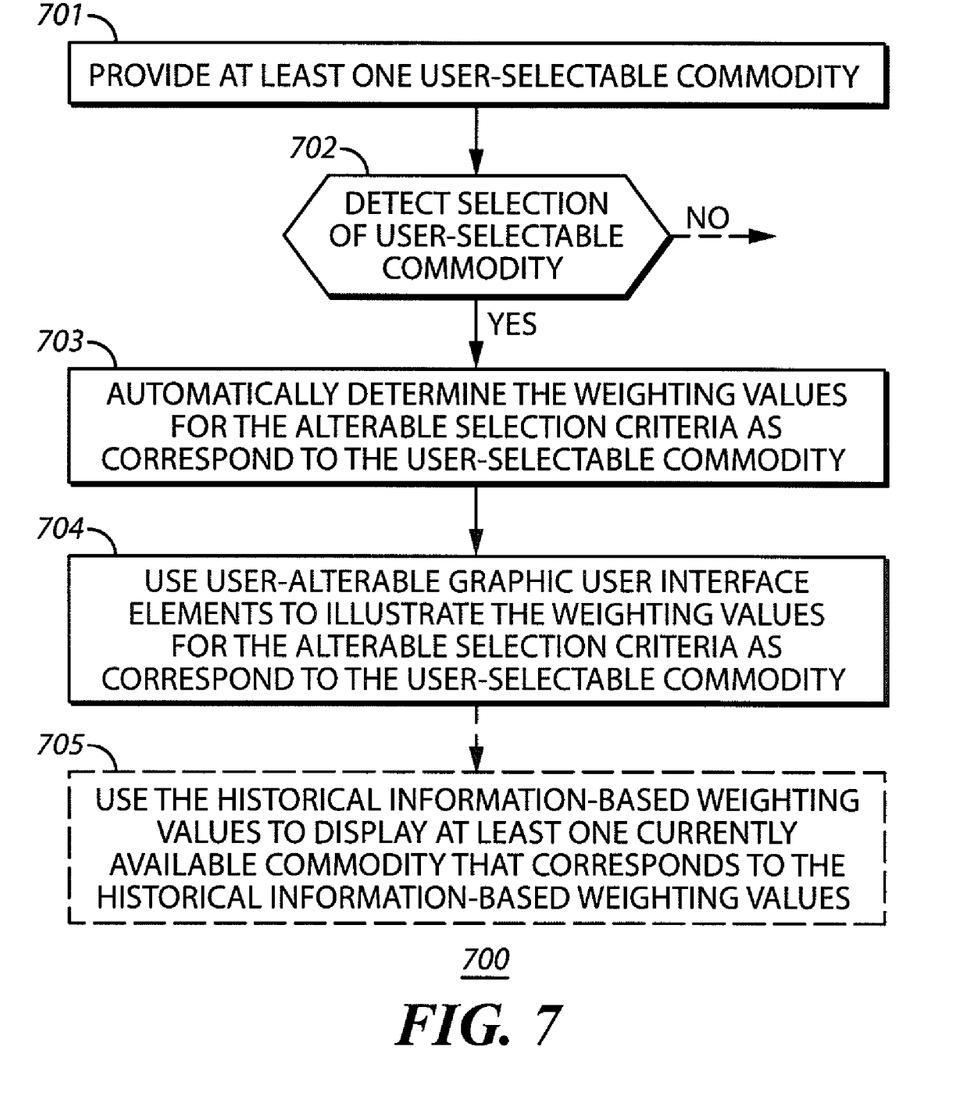
FIG. 7 comprises a flow diagram as configured in accordance with various embodiments of the invention.

Referring now to FIG. 7, additional optional approaches may be considered. By this process 700 the user is provided 701, via the display, with at least one user-selectable commodity. This user-selectable commodity may be provided as the result of any of the methods described above, or the user may enter, for example, the name and/or model of the commodity into a search field so that the commodity may then be provided. The selection of the user-selectable commodity is then detected 702. The selection may be made using any known computer input device. Upon detecting 702 selection of the user-selectable commodity, the weighting values for the alterable selection criteria as correspond to the user-selectable commodity are automatically determined 703. If the selection of the user-selectable commodity is not detected, then the display and the graphic user interface elements remain unchanged and this process 700 terminates.

The user-alterable graphic user interface elements are then used 704 to illustrate the weighting values for the alterable selection criteria as correspond to the user-selectable commodity. This option allows a user to view the settings of the user-alterable graphic user interface elements that would be a perfect (or at least a best) match for the selected commodity. A user may wish to use this feature, for example, to determine how close the settings for a particular commodity are to the user's own ideal. In this way, the feature may allow a user to better evaluate commodities, particularly those commodities which are not initially the top-ranked products for that user.

Figure 8:
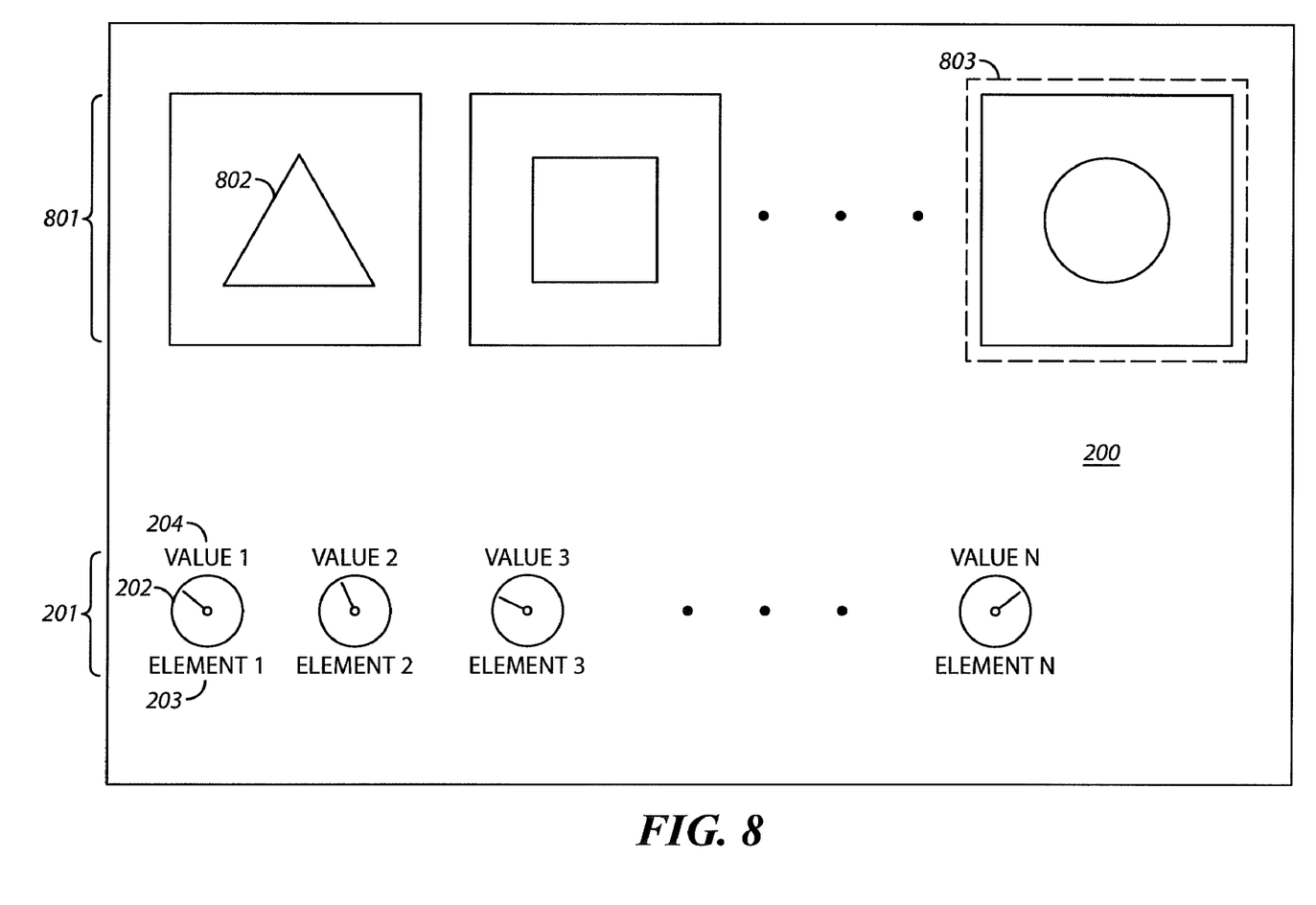
FIG. 8 comprises a schematic example of a display as configured in accordance with various embodiments of the invention.

An illustrative example of such an embodiment may be shown by referring to FIG. 8. In this display 200, a row of user-alterable graphic user interface elements 201 are provided and represented by rotating knobs. Again, each element has a label 203 and represents a particular criterion (or criteria) for the type of product being searched. In addition, the corresponding current weighting value 204 for each element is also displayed. In this illustration, rather than only displaying the best match, several of the most closely-matching commodities 801 are provided. The commodities may be displayed or ranked in order according to how well each commodity matches the settings, with the first commodity 802 being the best match. In examining the displayed commodities, the user may decide to view the specific settings for a particular commodity 803 to determine how the element settings for that commodity may have differed from the settings initially defined by the user. Therefore, the user will select that commodity 803. Alternatively, it should be noted, the user may have entered the name of the commodity into the "Lookup Product" field 208 and then selected a corresponding search button 209. The commodity provided as a result of the search may have then been selected by the user.

Figure 9:
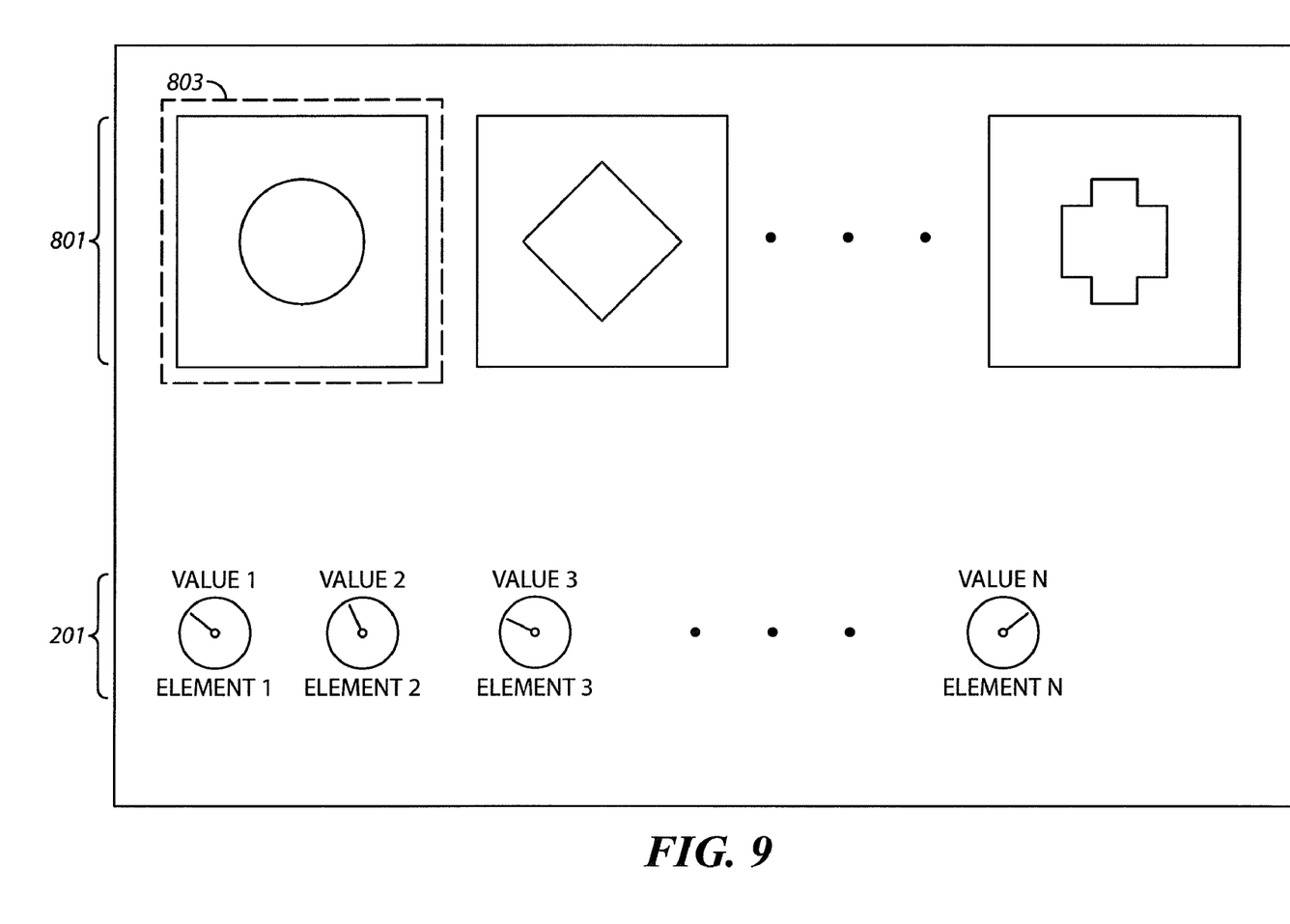
FIG. 9 comprises a schematic example of a display as configured in accordance with various embodiments of the invention.

Referring now to FIG. 9, a new display is provided with the selected commodity 803 being shown as the top-ranking match. In addition, the row of user-alterable graphic user interface elements 201 will now reflect the element settings and values for the selected commodity 803. Further, other commodities 801 that closely match the settings may also be displayed. Therefore, the user may now examine the particular element settings and values for this commodity and also view other commodities that closely match these settings.

In another embodiment, and referring again to FIG. 7, the user may wish to view commodities that have settings that closely match a commodity that is no longer in production. In such a case, historical information regarding the out-of-production user-selectable commodity may be automatically accessed (for example, by accessing a corresponding local or remote storage resource). This historical information may generally comprise information regarding the particular features and/or characteristics of the commodity. This historical information may then be used to automatically determine the weighting values for the alterable selection criteria as correspond to the user-selectable commodity. These historical information-based weighting values may then be used 705 to display at least one currently available commodity that corresponds to the historical information-based weighting values. Therefore, the user may now view commodities which have similar features to the commodity that is no longer in production.

This embodiment may be shown by referring again to FIG. 2. A field 208 may be provided in which the user may enter, for example, the name or model number of an obsolete or out-of-production product. The user may then select a corresponding search button 209. The historical information regarding that product is then accessed and the weighting values are determined based on that historical information. Referring now to FIG. 8, the user will be provided with a display of those currently-produced commodities 801 that have settings and values similar to the out-of-production commodity. In addition, a row of user-alterable graphic user interface elements 201 may display the settings and values that correspond to the values for the out-of-production commodity.

Figure 10:
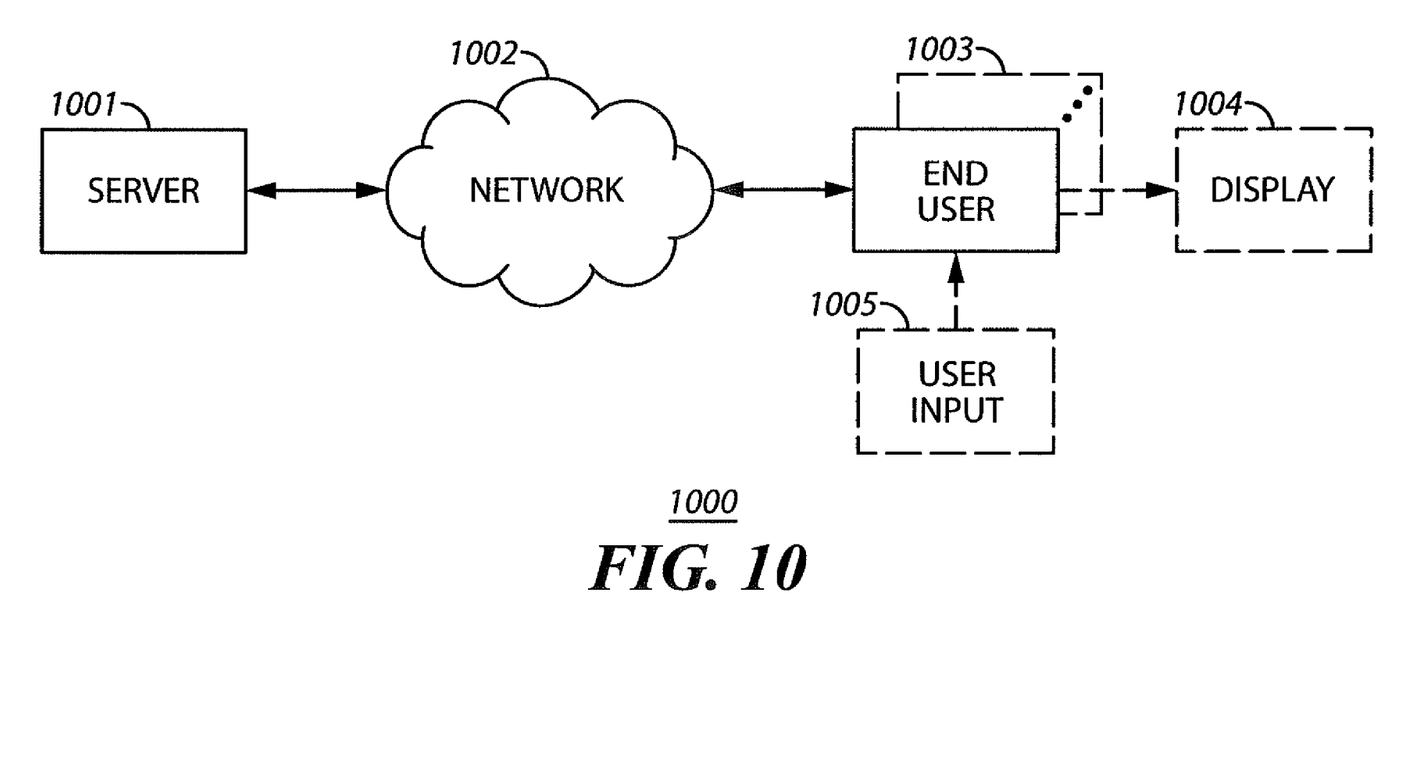
FIG. 10 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 10, an illustrative approach to such a platform will now be provided. FIG. 10 generally depicts pertinent portions of an apparatus 1000 for facilitating interactive criteria-based commodity comparison. This apparatus 1000 includes generally a server 1001 operably coupled to a network 1002, and at least one end user 1003 connected to the network 1002.

The server 1001 may comprise a memory having stored therein a plurality of user-alterable graphic user interface elements. The plurality of user-alterable graphic user interface elements may again comprise, for example, at least one of:

a slider tool;
a rotating knob;
a push, hold, and drag button;
a touch screen element; and/or
a select, drag and drop value.

Each of the plurality of user-alterable graphic user interface elements corresponds to at least one alterable selection criteria, such that the plurality of user-alterable graphic user interface elements serve to illustrate current weighting values as correspond to such alterable selection criteria. The alterable selection criteria may comprise, for example, criteria as pertain to points of differentiation between commodities. Further, the alterable selection criteria may also comprise criteria as pertain to points of user preference. In addition, the aggregate sum of the current weighting values as correspond to all of the plurality of user-alterable graphic user interface elements stored in the memory will comprise a particular value.

As described above, at least one of the user-alterable graphic user interface elements stored in the memory may optionally comprise a multi-criteria user-alterable graphic user interface element that corresponds to at least two alterable selection criteria. Further, the at least two alterable selection criteria that form the multi-criteria element may each have a corresponding weighting value, wherein the weighting value for the multi-criteria element comprises a sum of the weighting values as correspond to each of the at least two alterable selection criteria.

The apparatus further comprises a display interface operably coupled to the memory within the server 1001. The display interface is constructed and arranged to facilitate selective presentation of the plurality of user-alterable graphic user interface elements on a display 1004 which may be viewed by the end user 1003. The display interface may then detect direct user alteration of a given one of the user-alterable graphic user interface elements, which alteration causes a change in the weighting value that corresponds to the given one of the user-alterable graphic user interface elements. The direct user alteration of a given one of the user-alterable graphic user interface elements is provided via user input 1005 by the end user 1003.

The display interface may also facilitate storing relative value information regarding present relative weighting values of non-directly-adjusted user-alterable graphic user interface elements to provided stored relative value information. Further, the display interface may provide adjusted current weighting values for presentation on the display 1004 by facilitating automatic adjustment of the current weighting values as correspond to the non-directly-adjusted user-alterable graphic user interface elements. The current weighting values are adjusted, at least in part, as a function of the direct user alteration and the stored relative value information to ensure that the aggregate sum of the current weighting values as correspond to all of the user-alterable graphic user interface elements continues to comprise the particular value. In addition, the adjusted weighting values also ensure, to an extent reasonably possible, that the current weighting values for each of the non-directly-adjusted user-alterable graphic user interface elements continue to maintain their relative values vis-à-vis one another. The display interface then provides for illustration of the adjusted current weighting values by automatically modifying corresponding user-alterable graphic user interface elements on the display 1004 of the end user 1003.

As set forth in the above, the apparatus 1000, as shown in FIG. 10, will remember and attempt to persist relative differences between automatically adjusted current weight values for non-directly adjusted user-alterable graphic user interface elements, notwithstanding previous automatic adjustment of these current weighting values to a point of equality.

The display interface of the apparatus 1000 may be further constructed and arranged to provide, via the display 1004, at least one user-selectable commodity. Upon detecting a selection of the user-selectable commodity via user input 1005 by the end user 1003, the display interface may automatically facilitate determination of the weighting values for the alterable selection criteria as correspond to the user-selectable commodity. The user-alterable graphic user interface elements will then be used to illustrate the weighting values for the alterable selection criteria as correspond to the user-selectable commodity.

For a user-selectable commodity that is no longer in production, the display interface may automatically facilitate access of historical information regarding the user-selectable commodity and use of the historical information to automatically determine the weighting values for the alterable selection criteria as correspond to the user-selectable commodity. Further, the display interface may facilitate use of the historical information-based weighting values to display at least one currently available commodity that corresponds to the historical information-based weighting values.

Those skilled in the art will recognize and understand that such an apparatus 1000 may be comprised of a plurality of physically distinct elements as is suggested by the illustration shown in FIG. 10. It is also possible, however, to view this illustration as comprising a logical view, in which case one or more of these elements can be enabled and realized via a shared platform. It will also be understood that such a shared platform may comprise a wholly or at least partially programmable platform as are known in the art.

The teachings, as set forth above, provide consumers with a user-friendly and efficient method for comparing commodities to assist in selection of an appropriate commodity based on the individual needs of a consumer. This product comparison tool provides for the dynamic and interactive adjustment of weighting values for a plurality of selection criteria, such that a user may prioritize those features that are most important. Maintaining relative weighting values, even after adjustment to a point of equality, ensures that a user's previously established settings will not be lost. Thus, the described embodiments provide for effective commodity comparison and will assist a user in selecting a commodity that best suits the needs and desires of the user.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

Once such modification may include, for example, the ability to lock at least one of the plurality of user-alterable graphic user interface elements at a given weighting value to provide at least one locked user-alterable graphic user interface element. As a result, the weighting value of the at least one locked user-alterable graphic user interface element remains unchanged upon the automatic adjustment of the current weighting values as correspond to the non-locked, non-directly-adjusted user-alterable graphic user interface elements. In addition, the at least one locked user-alterable graphic user interface element will not maintain a relative value vis-à-vis the weighting values of each of the non-locked, non-directly adjusted user-alterable graphic user interface elements. However, the non-locked, non-directly adjusted user-alterable graphic user interface elements will continue to maintain their relative values vis-à-vis one another. In addition, the aggregate sum of the current weighting values as correspond to all of the plurality of user-alterable graphic user interface elements (both locked and non-locked) will continue to comprise the particular value.

Figure 11:
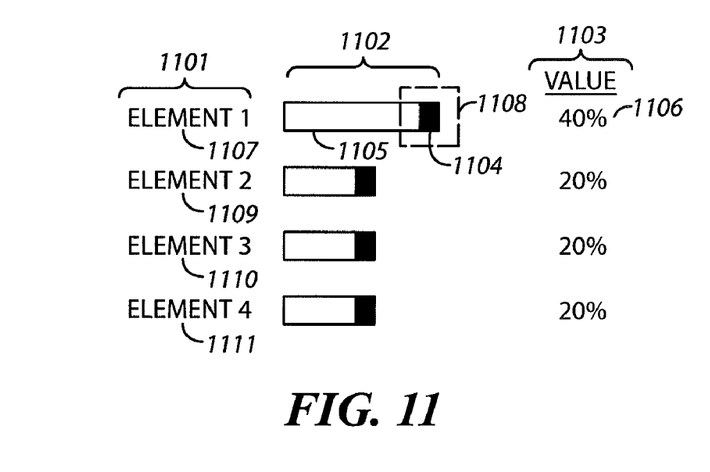
FIG. 11 comprises a schematic example of a display as configured in accordance with various embodiments of the invention.

To illustrate, and referring now to FIG. 11, a schematic example of a plurality of user-alterable graphic user interface elements are shown. In this example, a column 1101 of four user-alterable graphic user interface elements is provided, with each element relating to an alterable selection criterion. The elements are each graphically depicted by slider tools 1102, with each slider tool having an associated weighting value as displayed in the value column 1103. Again, the slider tool for each element may be adjusted by selecting the end portion of the tool 1 104 (using any known computer input device) and sliding the end portion 1104 to the right or the left, thereby increasing or decreasing the length portion 1105 and the corresponding weighting value 1106. It should be noted that in this illustration, the aggregate sum of the weighting value totals 100%.

The user may decide that the weighting value of Element 1 1107 should remain at 40%, but that the remaining elements need further adjustment. Therefore, the user may "lock" the position 1108 of Element 1 1107 at 40% such that the position of Element 1 1107 will not change even when the remaining elements are adjusted. The user may lock an element in any of a variety of ways, such as, for example, by selecting a "lock" button or function next to Element 1 or by clicking on the weighting value next to Element 1.

Figure 12:
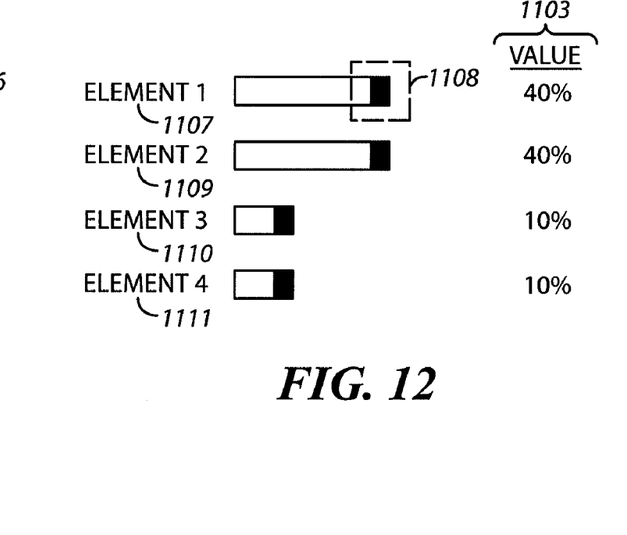
FIG. 12 comprises a schematic example of a display as configured in accordance with various embodiments of the invention.

Once Element 1 1107 has been locked at 40%, the user may then continue to adjust the remaining unlocked elements. The adjustment of the remaining elements will follow the teachings as described above, in which the relative positions of the remaining elements will be stored and adjusted such that the relative positions of the remaining elements are maintained. In this illustration, the user increases Element 2 1109 to 40%. As shown in FIG. 12, while Element 1 1107 is locked at 40%, Element 3 1110 and Element 4 1111 will decrease to 10% to maintain the aggregate sum of 100%. These adjusted positions are shown in FIG. 12, along with the corresponding column of adjusted weighting values 1103. It should be noted that the relative positions for Element 3 1110 and Element 4 1111 have been maintained in the adjustment of Element 2 1109. However, the initial relative position of Element 1 1107 as to Elements 3 1110 and 4 1111 shown in FIG. 11 (that is, a value of 40% that is twice that of the 20% value for Elements 3 1110 and 4 1111) is not maintained. Rather, by locking Element 1 1107 the relative position is lost.

Figure 13:
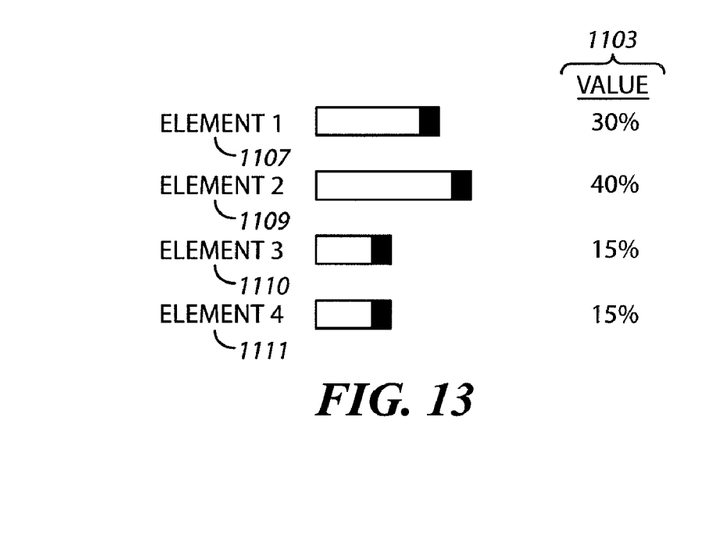
FIG. 13 comprises a schematic example of a display as configured in accordance with various embodiments of the invention.

By comparison, if Element 1 1107 had not been locked, then the relative position of Element 1 1107 vis-à-vis the other elements would have been maintained. If the elements were initially set as shown in FIG. 11 and then the user again adjusted Element 2 1109 to 40%, but without first locking Element 1 1107, then Elements 1, 3, and 4 would adjust relative to one another. This result is shown in FIG. 13 with the resulting values displayed in the value column 1103. Element 2 1109 has been adjusted up to 40%, so Elements 1, 3 and 4 have been decreased so that the aggregate sum remains at 100%. In the initial settings of FIG. 11, Element 1 (40%) had twice the value of Elements 3 (20%) and 4 (20%). Referring again to FIG. 13, Element 1 (30%) still maintains a relative value of twice the value of Elements 3 (15%) and 4 (15%).

We claim:

1. A method comprising:

providing, via a display, a plurality of user-alterable graphic user interface elements, wherein each of the plurality of user-alterable graphic user interface elements corresponds to at least one alterable selection criteria, such that the plurality of user-alterable graphic user interface elements serve to illustrate current weighting values as correspond to such alterable selection criteria and wherein the aggregate sum of the current weighting values as correspond to all of the plurality of user-alterable graphic user interface elements comprises a particular value;

detecting direct user alteration of a given one of the user-alterable graphic user interface elements, which alteration causes a change in the weighting value that corresponds to the given one of the user-alterable graphic user interface elements;

storing relative value information regarding present relative weighting values of non-directly-adjusted user-alterable graphic user interface elements to provide stored relative value information;

providing adjusted current weighting values by automatically adjusting the current weighting values as correspond to the non-directly-adjusted user-alterable graphic user interface elements as a function, at least in part, of the direct user alteration and the stored relative value information to ensure that the aggregate sum of the current weighting values as correspond to all of the user-alterable graphic user interface elements continues to comprise the particular value while further ensuring, to an extent reasonably possible, that the current weighting values for each of the non-directly-adjusted user-alterable graphic user interface elements continue to maintain their relative values vis-à-vis one another;

illustrating the adjusted current weighting values by automatically modifying corresponding user-alterable graphic user interface elements;

such that the method will remember and attempt to persist relative differences between automatically adjusted current weight values for non-directly adjusted user-alterable graphic user interface elements after previous automatic adjustment of these current weighting values to a minimum identical value.

2. The method of claim 1 wherein the alterable selection criteria comprises criteria as pertain to points of differentiation between commodities.

3. The method of claim 2 wherein the alterable selection criteria further comprises criteria as pertain to points of user preference.

4. The method of claim 1 wherein at least one of the plurality of user-alterable graphic user interface elements comprises a graphic depiction of at least one of:
a slider tool;
a rotating knob;
a push, hold, and drag button;
a touch screen element;
a select, drag, and drop value.

5. The method of claim 1 further comprising:
providing, via the display, the current weighting values as correspond to at least some of the user-alterable graphic user interface elements.

6. The method of claim 1 further comprising:
providing, via the display, a concurrent presentation of at least one item that best matches the current weighting values for the selection criteria.

7. The method of claim 6 wherein providing, via the display, a concurrent presentation of at least one item that best matches the current weighting values for the selection criteria further comprises automatically displaying at least one item that then best matches the current weighting values subsequent to detecting direct user alteration of the given one of the user-alterable graphic user interface elements.

8. The method of claim 1 wherein at least one of the plurality of user-alterable graphic user interface elements comprises a multi-criteria user-alterable graphic user interface element that corresponds to at least two alterable selection criteria.

9. The method of claim 8 wherein each of the at least two alterable selection criteria each has a corresponding weighting value wherein the weighting value as corresponds to the multi-criteria user-alterable graphic user interface element comprises a sum of the weighting values as correspond to each of the at least two alterable selection criteria.

10. The method of claim 9 further comprising:
providing, via the display, a user-assertable selector in conjunction with the at least one multi-criteria user-alterable graphic user interface element;
upon detecting user assertion of the user-assertable selector, displaying user-alterable graphic user interface elements as correspond to the at least two alterable selection criteria.

11. The method of claim 1 further comprising:
providing, via the display, at least one user-selectable commodity;
upon detecting selection of the user-selectable commodity:
automatically determining the weighting values for the alterable selection criteria as correspond to the user-selectable commodity;
using the user-alterable graphic user interface elements to illustrate the weighting values for the alterable selection criteria as correspond to the user-selectable commodity.

12. The method of claim 11 wherein the at least one user-selectable commodity is no longer in production and wherein automatically determining the weighting values for the alterable selection criteria as correspond to the user-selectable commodity further comprises:
automatically accessing historical information regarding the user-selectable commodity and using the historical information to automatically determine the weighting values for the alterable selection criteria as correspond to the user-selectable commodity.

13. The method of claim 12 further comprising:
using the historical information-based weighting values to display at least one currently available commodity that corresponds to the historical information-based weighting values.

14. The method of claim 1 further comprising:
locking at least one of the plurality of user-alterable graphic user interface elements at a given weighting value to provide at least one locked user-alterable graphic user interface element, such that the weighting value of the at least one locked user-alterable graphic user interface element remains unchanged upon the automatic adjustment of the current weighting values as correspond to the non-directly-adjusted user-alterable graphic user interface elements and such that the at least one locked user-alterable graphic user interface element does not maintain a relative value vis-à-vis the weighting values of each of the non-directly adjusted user-alterable graphic user interface elements.

15. An apparatus comprising:
a memory having stored therein a plurality of user-alterable graphic user interface elements, wherein each of the plurality of user-alterable graphic user interface elements corresponds to at least one alterable selection criteria, such that the plurality of user-alterable graphic user interface elements can serve to illustrate current weighting values as correspond to such alterable selection criteria and wherein the aggregate sum of the current weighting values as correspond to all of the plurality of user-alterable graphic user interface elements comprises a particular value;
a display interface operably coupled to the memory and being constructed and arranged to:
facilitate selective presentation of the plurality of user-alterable graphic user interface elements on a display and to detect direct user alteration of a given one of the user-alterable graphic user interface elements, which alteration causes a change in the weighting value that corresponds to the given one of the user-alterable graphic user interface elements;
facilitate storing relative value information regarding present relative weighting values of non-directly-adjusted user-alterable graphic user interface elements to provided stored relative value information;
providing adjusted current weighting values for presentation on the display by facilitating automatic adjustment of the current weighting values as correspond to the non-directly-adjusted user-alterable graphic user interface elements as a function, at least in part, of the direct user alteration and the stored relative value information to ensure that the aggregate sum of the current weighting values as correspond to all of the user-alterable graphic user interface elements continues to comprise the particular value while further ensuring, to an extent reasonably possible, that the current weighting values for each of the non-directly-adjusted user-alterable graphic user interface elements continue to maintain their relative values vis-à-vis one another;

illustrating the adjusted current weighting values by automatically modifying corresponding user-alterable graphic user interface elements on the display;

such that relative differences between automatically adjusted current weight values for non-directly adjusted user-alterable graphic user interface elements are remembered and persisted after previous automatic adjustment of these current weighting values to a minimum identical value.

16. The apparatus of claim 15 wherein the alterable selection criteria comprises criteria as pertain to points of differentiation between commodities.

17. The apparatus of claim 16 wherein the alterable selection criteria further comprises criteria as pertain to points of user preference.

18. The apparatus of claim 15 wherein at least one of the plurality of user-alterable graphic user interface elements comprises a graphic depiction of at least one of:
  a slider tool;
  a rotating knob;
  a push, hold, and drag button;
  a touch screen element;
  a select, drag, and drop value.

19. The apparatus of claim 15 wherein at least one of the plurality of user-alterable graphic user interface elements comprises a multi-criteria user-alterable graphic user interface element that corresponds to at least two alterable selection criteria.

20. The apparatus of claim 19 wherein each of the at least two alterable selection criteria each has a corresponding weighting value wherein the weighting value as corresponds to the multi-criteria user-alterable graphic user interface element comprises a sum of the weighting values as correspond to each of the at least two alterable selection criteria.

21. The apparatus of claim 15 wherein the display interface is further constructed and arranged to:
  provide, via the display, at least one user-selectable commodity;
  upon detecting selection of the user-selectable commodity:
  automatically facilitating determination of the weighting values for the alterable selection criteria as correspond to the user-selectable commodity;
  use the user-alterable graphic user interface elements to illustrate the weighting values for the alterable selection criteria as correspond to the user-selectable commodity.

22. The apparatus of claim 21 wherein the at least one user-selectable commodity is no longer in production and wherein automatically facilitating determination of the weighting values for the alterable selection criteria as correspond to the user-selectable commodity further comprises:
  automatically facilitating access of historical information regarding the user-selectable commodity and use of the historical information to automatically determine the weighting values for the alterable selection criteria as correspond to the user-selectable commodity.

23. The apparatus of claim 22 wherein the display interface is further constructed and arranged to:
  facilitate use of the historical information-based weighting values to display at least one currently available commodity that corresponds to the historical information-based weighting values.

* * * * *